United States Patent [19]

Propst

[11] 4,124,872
[45] Nov. 7, 1978

[54] RECORD/PLAYBACK APPARATUS

[76] Inventor: Franklin M. Propst, 501 W. Michigan, Urbana, Ill. 61801

[21] Appl. No.: 860,027

[22] Filed: Dec. 12, 1977

Related U.S. Application Data

[63] Continuation of Ser. No. 762,396, Jan. 26, 1977, abandoned.

[51] Int. Cl.² .................. G11B 17/02; G11B 5/016; G11B 21/08; G11B 5/55
[52] U.S. Cl. .................................. 360/72; 360/78; 360/99; 360/106
[58] Field of Search ............... 360/72, 99, 73, 78, 360/106; 358/128; 179/100.3 V; 274/9 B, 39 A

[56] References Cited

U.S. PATENT DOCUMENTS

| 3,724,860 | 4/1973 | Northrop et al. ............ 274/9 B |
| 3,729,201 | 4/1973 | Dollenmayer ............ 274/39 A |

Primary Examiner—Robert S. Tupper
Attorney, Agent, or Firm—Merriam, Marshall & Bicknell

[57] ABSTRACT

Record/playback apparatus including low speed and high speed motor-driven apparatus for engaging the rim of a flexible recording disc to rotate the disc. The high speed motor-driven apparatus positions the disc relative to a record/playback head at high speed and the low speed motor-driven apparatus drives the disc during playback.

14 Claims, 18 Drawing Figures

RECORD/PLAYBACK APPARATUS

This is a continuation, of application Ser. No. 762,396, filed Jan. 26, 1977, now abandoned.

BACKGROUND OF THE INVENTION

This invention relates generally to random access recording and playback apparatus and more particularly to apparatus for storing information on and/or retrieving information from a flexible, lightweight, grooveless recording disc.

The principles of the present invention are particularly useful in random access retrieval systems wherein a single item must be rapidly selected from a group of such items. For instance, reference may be made to U.S. Pat. No. 3,405,457, "Versatile Display Teaching System" issued to Donald L. Bitzer, wherein there is described a flexible computer controlled system for transmitting selected information to a number of student terminals. In such a computer-based education system, thousands of student terminals can be connected to a single computer. Each of these student terminals must be very flexible, providing random access audio information as well as video information in response to student inputs to the terminal, particularly where an audio response is better suited to the learning process than a visual response, e.g., in foreign language labs and the like.

In order to effectively aid the learning process in such applications, however, it is necessary that the substantial amounts of information be stored and that random access to the requested information be achieved with minimal delay. Many of the conventional storage apparatus, however, are not suitable to meet such requirements.

For example, in magnetic tape systems, the information is stored serially along the tape, and in order to access the desired information, it may be necessary to transport substantial lengths of the tape past the playback head before reaching that information. This not only results in slower response times but also produces tape wear as the tape is accessed to different storage locations, eventually degrading the quality of the audio played back.

Conventional recording disc turntables for playing back information stored on grooved discs are also undesirable. Because of the speed at which the disc must be rotated to access the information to be retrieved, the turntable platter develops a substantial angular momentum which is difficult to overcome when reducing the rotational speed to the level required for playback.

Another random access information retrieval apparatus adapted for use as a random access audio selector is disclosed in U.S. Pat. No. 3,738,227, issued to Donald L. Bitzer et al. In that apparatus, the audio selector was capable of randomly selecting any desired audio segment from 2,048 segments recorded along 64 radially spaced circular tracks of 32 segments each on a magnetic recording disc transported by a turntable during playback. Rapid access was provided by a novel spindle mechanism which lifted the disc from the turntable and rotated the disc at high speed to the desired audio segment. Specifically, the audio selector operated as a polar coordinate selection system having eleven 4-way control valves — six for positioning a piston-cylinder train radially to any one of the 64 tracks and five for positioning another piston-cylinder train to rotate the disc angularly to any one of the 32 segments along each track.

SUMMARY OF THE INVENTION

The random access information storage and retrieval apparatus of the present invention utilizes a grooveless recording disc which is thin, flexible and lightweight. A plurality of discrete information segments are stored on the disc along a plurality of structurally undefined circular paths having arbitrarily designated sectors, and the retrieval apparatus is useful to selectively retrieve a particular information segment from the disc.

The apparatus includes apparatus for sensing the stored information and playing the information back from the disc. The sensing apparatus is transported across the disc into radial alignment with the particular path in which the particular information segment is stored. Motor-driven apparatus is provided for selectively engaging the disc adjacent the rim thereof to rotate the disc at high speed until the disc is rotationally positioned with the initial path sector containing the particular information segment is at the sensing apparatus. Additional motor-driven apparatus is also included for selectively engaging the disc adjacent the rim thereof after the disc is rotationally positioned and rotating the disc at lower speed while the sensing apparatus retrieves that particular information segment from the disc.

In an embodiment of the present invention, the disc drive apparatus comprises a high speed motor and a lower speed motor located adjacent the rim of the disc and positioned with their respective motor shafts below the disc adjacent the rim. Pinch roller apparatus is selectively enabled to press the disc between the corresponding motor shaft and the pinch roller, the resulting frictional engagement between the pinch roller and the motor shaft, between the pinch roller and the top surface of the disc, and between the bottom surface of the disc and the motor shaft causing the disc to rotate at a predetermined speed.

BRIEF DESCRIPTION OF THE DRAWINGS

The features of this invention which are believed to be novel are set forth with particularity in the appended claims. The invention together with its further objects and advantages thereof may be best understood, however, by reference to the following description taken in conjunction with the accompanying drawings in which like reference numerals identify like elements in the several figures and in which:

DETAILED DESCRIPTION

With reference now to the drawings of FIGS. 1-15, inclusive, there is hereinafter described apparatus for recording and playing back information magnetically stored on a thin, flexible, grooveless recording disc.

Figures 1, 3, 4:
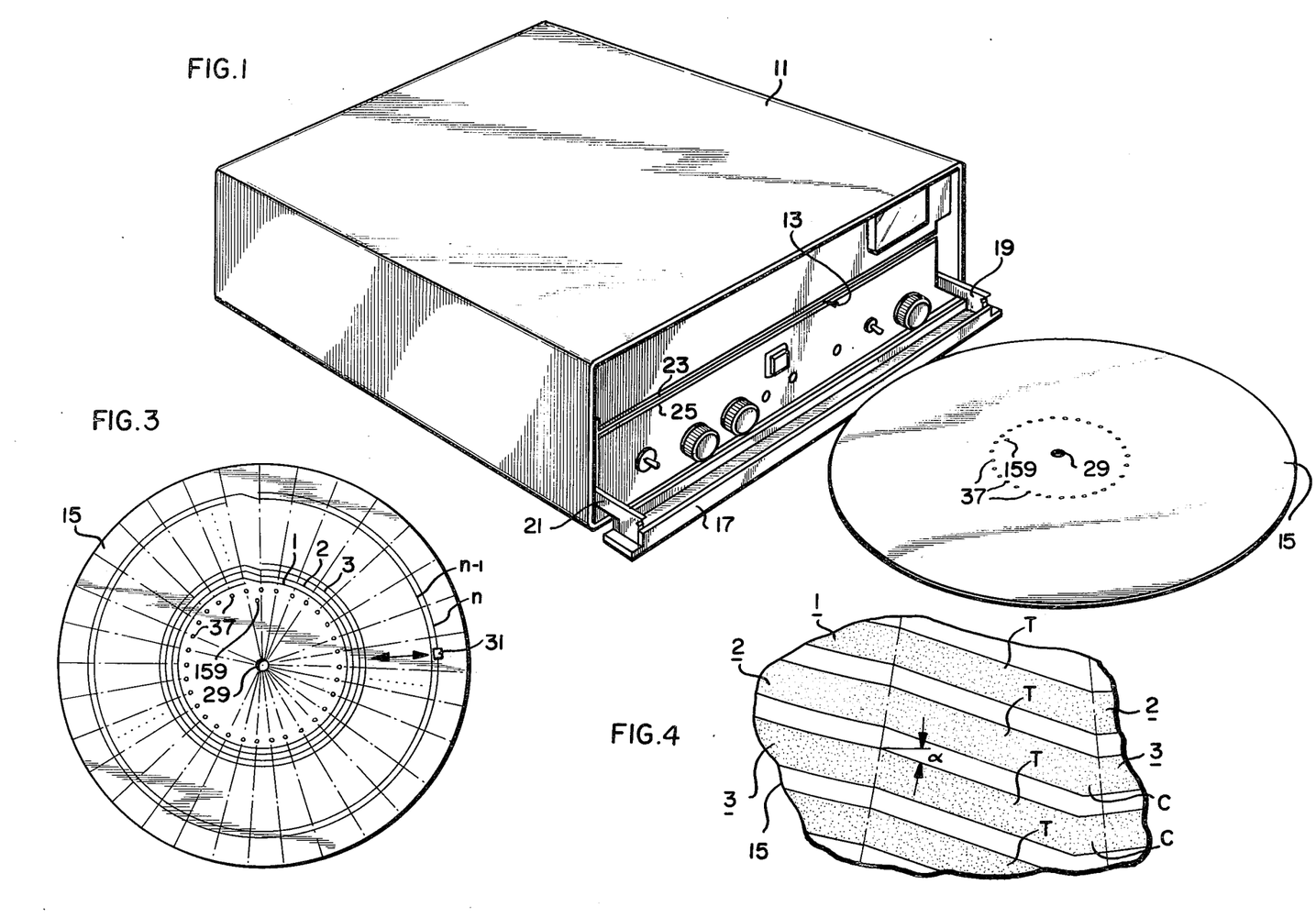
FIG. 1 is a perspective view of the information recording/playback apparatus and the recording disc.
FIG. 3 is a top plan view of the recording disc.
FIG. 4 is a partial top plan view of the recording disc.
Figure 2:
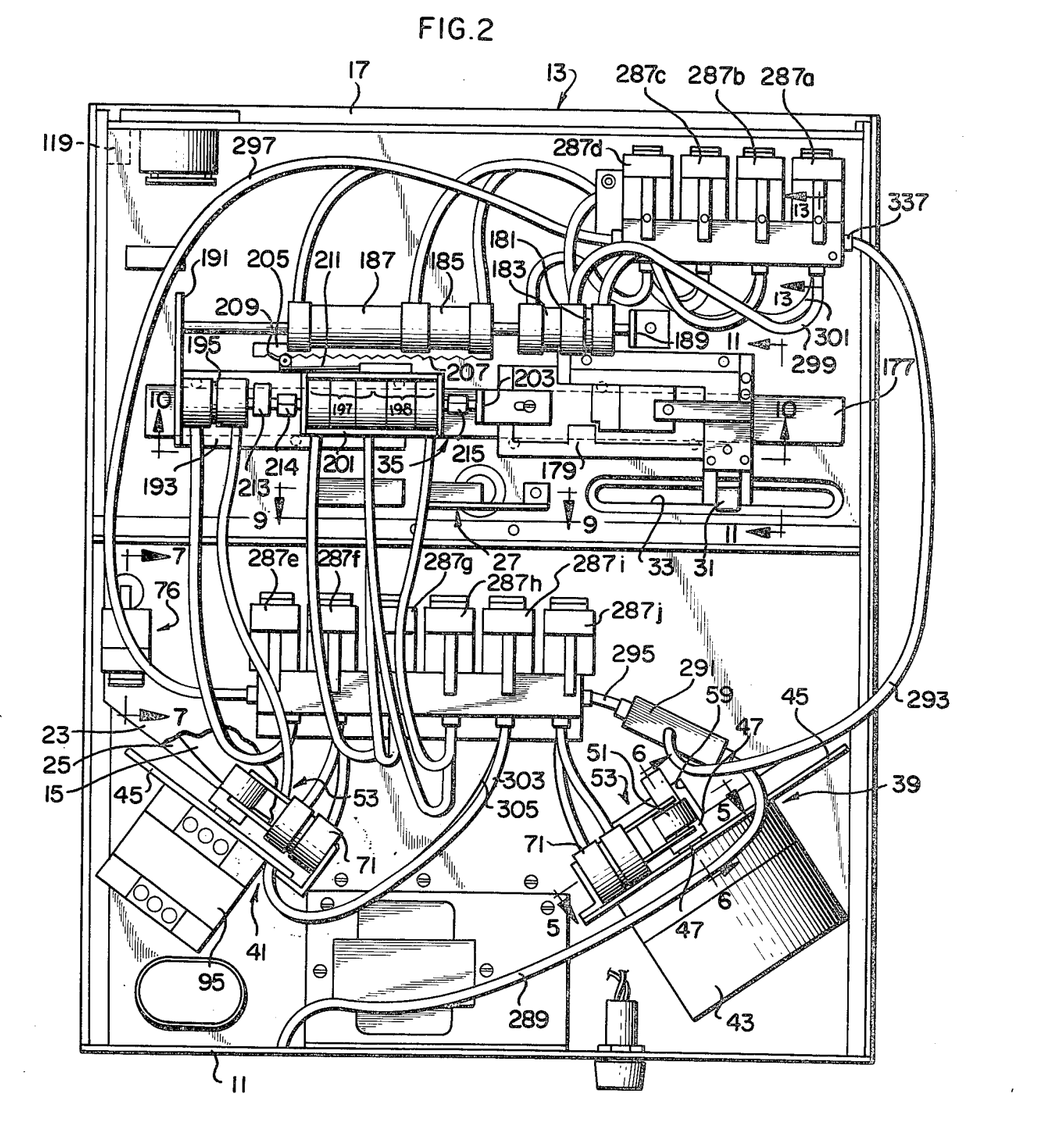
FIG. 2 is a sectional view of the apparatus taken along lines 2—2 in FIG. 1.

Referring particularly to FIGS. 1 and 2, the information recording/playback apparatus of the present invention is housed conventionally in a portable or rack mountable case 11 having a slot-like opening 13 extending across its front panel through which the information storage disc 15 is loaded into the apparatus. A combination handle and dust cover door plate 17 covers the slot 13 and is coupled to the case 11 by hinged arms 19 and 21 which allow the door 17 to be swung away from the slot 13 to serve conveniently as a handle or to permit the insertion of the information storage disc 15. In the apparatus, the disc 15 is accommodated between a top plate 23 and a bottom plate 25 comprising a deck area where a spindle mechanism, identified generally at 27 in FIG. 2, engages the center hole 29 of the disc to establish a pivot point about which the flexible disc 15 is driven or rotated by disc drive apparatus hereinafter described.

After the disc 15 is inserted into the deck, the information can be either recorded on or played back from the disc 15, depending on the particular mode of operation selected, by a magnetic record/playback head 31 and corresponding electronic circuitry also housed in the case 11. The electronic recording and playback circuitry contemplated generally comprises circuitry which is well known and common to recording and playback apparatus. Because such circuitry is only peripherally relevant to this invention and is not generally within the scope of the present invention, the recording and playback circuitry will be discussed in further detail only to the extent necessary to provide an understanding of the present invention.

The information storage disc 15, which is further illustrated in FIGS. 3 and 4, comprises a thin, grooveless, plastic disc that is somewhat flexible, or floppy, and lightweight. The disc 15 contemplated in the present embodiment is Mylar plastic and is approximately fifteen inches in diameter and five mils thick, weighs between twenty and forty grams and is coated with a magnetic oxide film on at least its top surface. Information is initially stored on the disc 15 by the recording portion of the recording/playback apparatus or, alternatively, it can be recorded on the disc 15 with a complementary master recording apparatus. As the disc 15 is rotated, the record/playback head 31 has access to the disc 15 through a slot 33 (FIG. 2) which extends radially in the top plate 23 from the vicinity of the spindle mechanism 27 to a point adjacent the edge of the disc 15. The needle-like oxide particles along the path traced by the record/playback head, also shown schematically at 31 in FIG. 3, are magnetically reoriented to be representative of and thereby store the information. Information retrieval is subsequently accomplished by the playback circuitry of the apparatus which, in conjunction with the record/playback head 31, detects or senses the magnetically stored information and converts it, for example, to audio information.

Since the disc 15 is grooveless and therefore there is no track for the record/playback head 31 to follow, a precision head positioning apparatus, identified generally at 35 in FIG. 2, is provided to selectively move the head 31 along the slot 33 in a manner such that the head traces a precise path on the disc 15 as the disc is rotated. The path traced by the head 31 and along which the information is stored comprises a plurality of uniformly spaced, circular paths arranged concentrically about the center hole 29 of the disc 15 and extending outwardly from an intermediate radial point to a point near the rim of the disc 15. In one embodiment, the record/playback head 31 is positionable to any one of one hundred and twenty-eight circular paths, each path being about 0.020 inches wide and adjacent paths being about 0.012 inches apart. For purposes of the present description, several of the circular paths have been shown in FIGS. 3 and 4 and are identified generally at 1, 2, 3, . . ., n. It will be understood, however, that the paths are not visible to the human eye and do not constitute grooves for guiding the record/playback head 31, but rather have been illustrated only for purposes of the present description. Also, the relative width of the paths and the spacing between the paths are not necessarily accurately portrayed, but rather have been enlarged for purposes of illustration. Each of the circular paths 1, 2, 3, . . . , n., in turn, comprises a plurality of interconnected arcuate sectors arbitrarily defined by a corresponding plurality of holes 37 uniformly spaced at a constant radius around the center hole 29 of the disc 15. This is best illustrated in FIG. 3 where dashed lines extending radially from the center of the disc 15 have been provided to show the division of the circular paths into the imaginary sectors.

In this particular embodiment, thirty-two holes 37 are provided to define thirty-two corresponding arcuate sectors comprising each circular path. The several segments of information stored on the disc 15 for playback may be disposed along a continuous portion of the path comprising one or more corresponding path sectors. To further accommodate continuous information storage and thus provide continuous playback of longer information units, transition paths T interconnect adjacent circular paths as illustrated in FIG. 4.

In order to retrieve a particular segment of information from its stored location, the head positioning apparatus 35 (FIG. 2) moves the record/playback head 31 radially along the slot 33 to the particular circular path in which the initial sector storing the required information segment is located. As the head 31 is aligned with the correct path, the disc drive apparatus rotates the disc 15 at high speed until the initial sector in which the information is stored is at the record/playback head 31. The drive apparatus then proceeds to rotate the disc 15 at a slower speed while that particular information segment is played back.

In accordance with one aspect of the present invention, the disc drive apparatus includes a pair of motor-driven apparatus, identified generally at 39 and 41 in FIG. 2, adapted to engage the disc 15 adjacent the rim thereof and rotate the disc. The apparatus 39 includes a high-speed motor 43 rotating continuously at about 3200 revolutions per minute for rotationally positioning the disc 15 to align the particular path sector corresponding to the beginning of the required information segment with the record/playback head 31.

Figure 5:
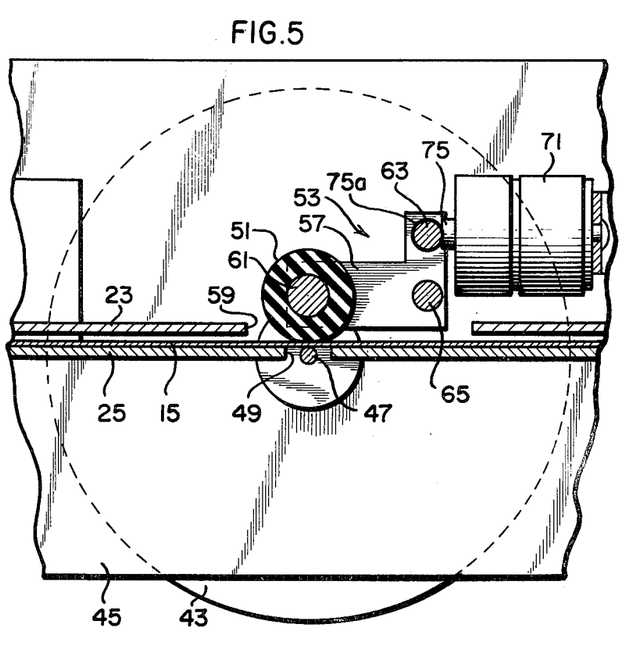
FIG. 5 is a sectional view of the disc drive apparatus taken along lines 5—5 in FIG. 2.
Figure 6:
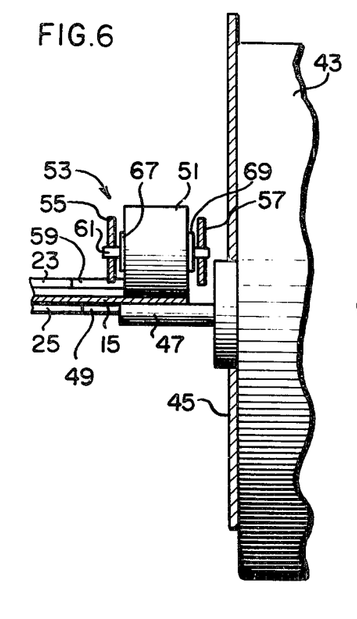
FIG. 6 is a sectional view of the disc drive apparatus taken along lines 6—6 in FIG. 2.

As further illustrated in FIGS. 5 and 6, the high-speed motor 43 is mounted beyond the rim of the disc 15 on a vertical support plate 45 affixed to the edge of the deck. Moreover, the motor 43 is positioned so that its shaft 47 extends inward radially toward the spindle mechanism 27. A roller member may be mounted to the end of the motor shaft 47. A slot 49 is provided in the bottom deck plate 25 to accommodate the shaft 47 so that the top surface of the shaft 47 contacts the bottom side of the disc 15 adjacent its rim when the disc 15 is in position in the deck.

A pinch roller 51 is positioned above the shaft 47 at one end of a pivoted assembly 53 between side members 55, 57 and has access to the disc 15 through a corresponding slot 59 in the top deck plate 23. The pinch roller 51 comprises a rubber cylinder having a short rod 61 extending therethrough to engage the outer ends of assembly side members 55 and 57. The assembly side members 55 and 57 are also interconnected at their respective top ends by a rod 63 and pivoted about a lower interconnecting rod 65 extending through side member 57 and supportably mounted to plate 45. A pair of washers 67 and 69 space the pinch roller 51 between the side members 55 and 57 to insure that the roller 51 rotates freely as it rolls on the disc 15.

A pneumatic cylinder 71 is secured to a flange 73 extending inwardly from plate 45 and is positioned with its piston shaft 75 directed toward rod 63 in a direction horizontally normal thereto. In operation, the pneumatic cylinder 71 is selectively actuated by compressed air to extend its piston shaft 75 to contact and move the rod 63 forward. The pivoted assembly 53, in turn, translates the force applied to rod 63 by pneumatic cylinder 71 to pinch roller 51 causing the pinch roller 51 to exert downward pressure on the disc 15. When the pinch roller 51 is forced downwardly to squeeze the rim of the disc 15 against the motor shaft 47, the resulting frictional engagement between the rotating motor shaft 47 and the pinch roller 51, the top surface of the disc 15 and the pinch roller 51, and the bottom surface of the disc 15 and the motor shaft 47 causes the disc 15 to rotate.

The assembly 53, including the pinch roller 51, is positioned so that the roller 51 is skewed slightly forward from the true radial direction at its end closest to the center of the disc 15. The pinch roller 15 is thereby effective to exert outwardly directed radial tension on the disc 15 and prevent buckling of the disc 15 during rotation.

Although the pinch roller 51 may be continuously in contact with the disc 15, the pressure exerted on the disc 15 due to the weight of the pinch roller 51 and assembly 53 may produce drag and affect the rotation of the disc 15. A spring loop member 75a attaches to the piston shaft 75 to lift the roller 51 after rotation of the disc 15 is effected by means of the pneumatic cylinder 71 acting in concert with the assembly 53 to press the pinch roller 51 down onto the disc 15. The resulting frictional engagement between the rim of disc 15, the pinch roller 51 and the rotating motor shaft 47 causes the disc to rotate at high speed until the initial path sector containing the information to be played back is at the record/playback head 31. The shaft 75 of the pneumatic cylinder 71 is then withdrawn and the pinch roller 51 is released.

Figures 7, 9:
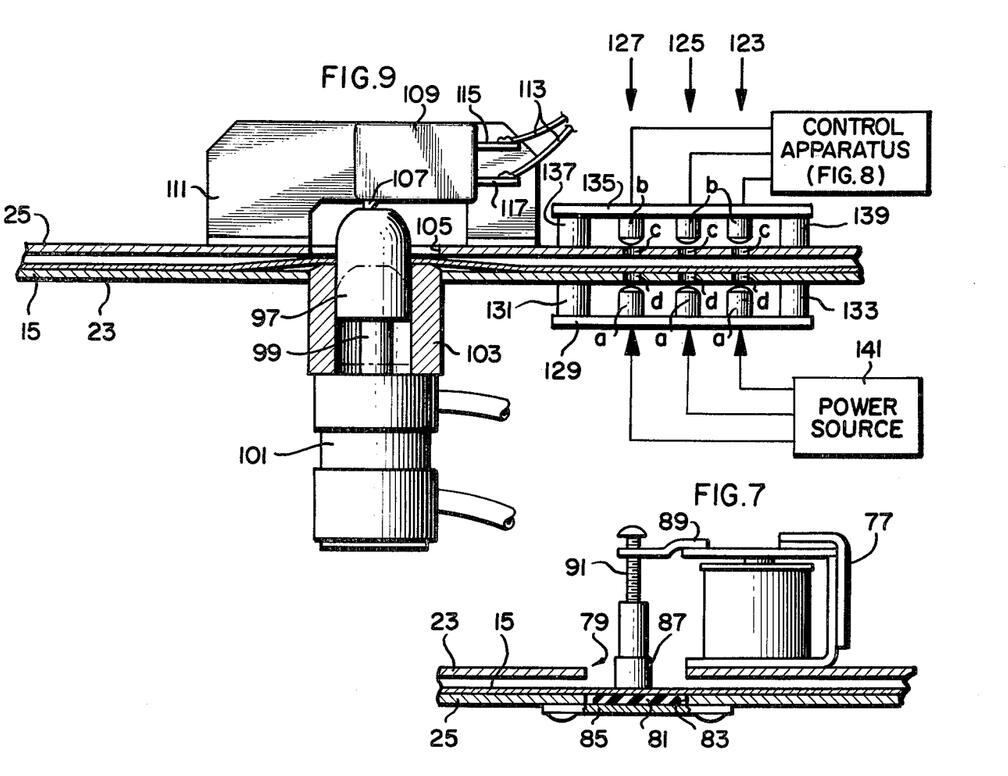
FIG. 7 is a sectional view of the disc braking apparatus taken along lines 7—7 in FIG. 2.
FIG. 9 is a sectional view of the spindle mechanism and the disc-monitoring sensing apparatus taken along lines 9—9 in FIG. 2.

FIG. 7 illustrates apparatus for braking the disc 15 to a halt after the disc 15 has been rotated to the initial starting position and prior to playback. More particularly, the apparatus comprises a relay 77 mounted adjacent to an aperture 79 in the top deck plate 23 (FIG. 2) near the edge thereof and directly above the disc 15. A felt pad 81 or the like is mounted in and coextensive with a corresponding aperture 83 in the bottom deck plate 25 but slightly below the top surface thereof. The felt pad 81 is supported in the aperture 83 by a plate 85 riveted to the bottom surface of the deck plate 25. A brake shoe 87 is coupled to the relay arm 89 by an adjustable screw 91 and is pressed downward against the disc 15 responsive to the relay 77 being actuated. The adjustable screw 91 permits the brake shoe 87 to be adjusted to optimize the braking pressure applied to the disc 15 to prevent buckling or binding of the disc 15 while providing sufficient braking.

Thereafter, the motor-driven apparatus 41 including a lower-speed motor 95 is enabled and drives the disc 15 while the desired information is played back. Where, as in the present embodiment, the information is at audio frequencies, the motor 95 rotates the disc 15 to play back the stored information at the rate of 2–4 inches per second. Accordingly, a high-quality constant speed motor is used in this application whereas a lower-quality motor may be used for fast rotational positioning of the disc.

As may be seen in FIG. 2, the apparatus comprising the motor-driven apparatus 39 and 41 are substantially identical. Because the operational aspects of the apparatus 39 and 41 are also identical, the foregoing description in connection with apparatus 39 is equally applicable to apparatus 41, and accordingly no further description of apparatus 41 will be provided. In FIG. 2, the elements comprising apparatus 41 have been numbered to correspond to their respective counterparts in apparatus 39.

Figure 8:
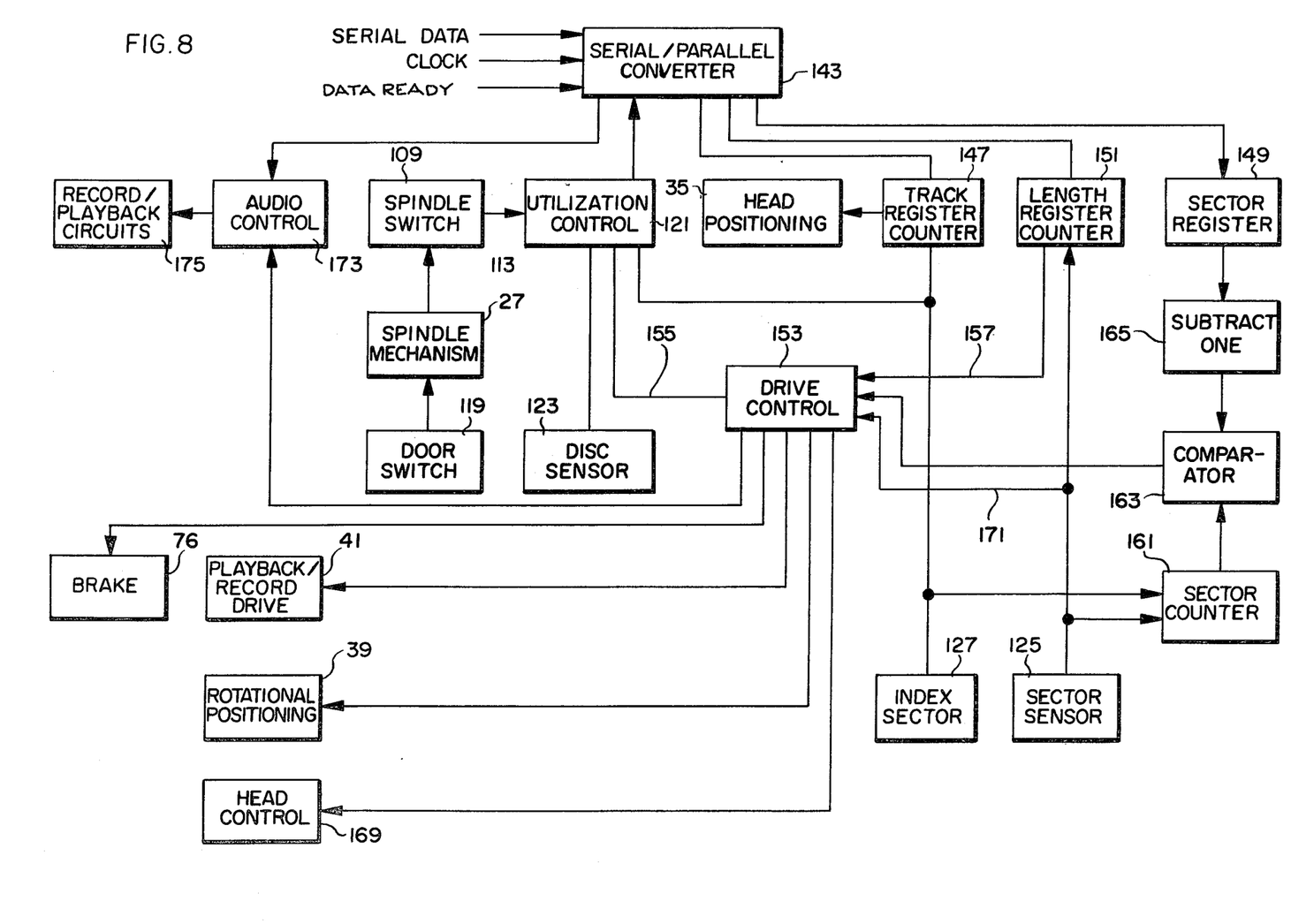
FIG. 8 is a schematic block diagram of apparatus for controlling the rotational positioning and record/playback operations of the disc.

Apparatus for controlling the record/playback apparatus, including the selective enablement of the motor-driven apparatus 39 and 41 to respectively rotationally position the disc 15 and rotate the disc 15 during playback, is illustrated in FIG. 8. The spindle mechanism, identified generally at 27 in FIG. 2, and associated portions of the control apparatus shown in FIG. 8 are shown in FIG. 9.

In particular, the spindle mechanism 27 (FIG. 9) comprises a spindle 97 mounted to the end of the piston shaft 99 of a pneumatic cylinder 101. The spindle 97 slides within a journal 103 mounted below and extending through the bottom deck plate 25 for a short distance. The pneumatic cylinder 101 is selectively actuable by the application of compressed air to reposition the spindle 97 within the journal 103 so that the spindle 97 extends through and engages the center hole 29 of the disc 15. When extended to engage the disc 15, the spindle 97 extends through an aperture 105 in the top plate 23 of the deck to contact the push button actuator 107 of a switch 109. The switch 109 is mounted in alignment with the spindle 97 directly over the aperture 105 on an upright flange 111 mounted to the top plate 23 of the deck. A pair of lead wires 113, coupled to the terminals, 115, 117, of the switch 109 couple the switch 109 to the apparatus (FIG. 8) controlling the automatic operation of the record/playback apparatus.

Upon insertion of the disc 15 into the deck, the door 17 (FIG. 1) is closed, actuating a switch 119 located adjacent the front panel of case 11. The door switch 119, in turn, enables the spindle mechanism 27, causing the spindle 97 to raise and close the switch 109. The spindle switch 109, in turn, provides one of the signals to the initialization control apparatus 121 (FIG. 8) necessary to initiate playback.

As shown in FIG. 9, the control apparatus includes corresponding pairs of light emitting diodes and light sensing phototransistors, 123a and 123b, 125a and 125b, 127a and 127b, respectively, the diodes 123a, 125a, 127a, being mounted below the deck and the phototransistors 123b, 125b, 127b above the deck. In particular, the light emitting diodes 123a, 125a, 127a are mounted on a plate 129 attached to the bottom side of the bottom deck plate 25 on a pair of downwardly extending posts 131 and 133, and the light sensing phototransistors 123b, 125b, 127b are each mounted directly above the corresponding light emitting diodes 123a, 125a, 127a on a plate 135 secured to the top side of the top deck plate 23 on posts 137 and 139. In turn, the light emitting diodes 123a, 125a, 127a and the phototransistors 123b, 125b, 127b are aligned with a like number of corresponding apertures 123c, 125c, 127c and 123d, 125d, 127d in each of the top and bottom deck plates 23 and 25, respectively. The light emitting diodes 123a, 125a, 127a are energized by means including a power source 141 coupled thereto to emit corresponding beams of light toward the phototransistors 123b, 125b, 127b when the apparatus is operational.

The diode-phototransistor pair 123a and 123b comprise a disc sensor 123. That is, when the disc 15 is not in the deck, the light beam from the light-emitting diode 123a reaches the corresponding phototransistor 123b. Whenever the disc is present in the deck, however, the beam from the diode 123a is blocked from phototransistor 123b by the disc 15, and a corresponding change in the output from phototransistor 123b results and another enabling signal is applied to the initialization control apparatus 121 (FIG. 8).

With reference again to FIG. 8, data comprising the track and sector location of the information segment and the length of the segment to be played back is serially transmitted in bit form to the SERIAL DATA input of a serial/parallel converter apparatus 143. Clock pulses are also coupled to the CLOCK input of the converter apparatus 143 to synchronize the various operations of the control apparatus. A "data ready" signal is applied to the corresponding input of the converter 143 to transfer the data to corresponding registers. More particularly, the data indicating the particular path along which the information segment is initially stored is coupled to a track register counter 147, and as hereinafter described, the head positioning apparatus 35, responsive to the data contained in the track register counter 147 repositions the record/playback head 31 radially to the appropriate path $n$. Also, the data identifying the particular sector at which the information segment begins is loaded into the sector register 149, and the data corresponding to the number of the information segments to be played back is loaded into the length register counter 151.

When all of the data is loaded, the final enabling signal from the track register counter 147 is applied to the initialization control apparatus 121, which, in turn, provides one enabling signal to a drive control apparatus 153 via control line 155. A second enabling signal is applied to the drive control apparatus 153 by the length register counter 151 via line 157 so long as the data contained in counter 151 indicates that a portion of the desired information remains to be played back, i.e., the counter 151 has not counted to zero.

Other inputs to the control apparatus shown in FIG. 8 are derived from the diode-phototransistor pairs 125a and 125b, 127a and 127b. In particular, a hole 159 is provided in the disc 15 (FIG. 1) to serve as a reference point or index from which the rotational position of the disc 15 can be determined. The diode-phototransistor pair 127a and 127b comprise an index sensor 127 and are located a distance radially from the spindle 97 equal to the distance at which the hole 159 is located from the center hole 29 of the disc 15. As the disc 15 is rotated by the motor-driven rotational positioning apparatus 39, the hole 159 passes the light beam from the light emitting diode 127a through to the light-sensitive phototransistor 127b once per disc revolution when the hole 159 is aligned with the diode-phototransistor pair 127a and 127b. At all other times, the disc 15 blocks the light beam emitted by the diode 127a. As a result, a pulse is developed at the output of the index sensor phototransistor 127b once during each revolution of the disc 15 and coupled to a sector counter 161 in the control apparatus (FIG. 8).

Similarly, the diode-phototransistor pair 125a and 125b comprise a sector sensor 125 which is positioned radially from the center hole 29 in alignment with the sector holes 37. As the disc 15 rotates, the sector sensor phototransistor 125b, responsive to monitoring the holes 37, develops a pulsed output signal which, in turn, is also coupled to the sector counter 161. Since thirty-two holes 37 are provided in the disc 15, thirty-two corresponding pulses are applied to the sector counter 161 during each revolution of the disc 15.

As shown in FIG. 8, the rotational position reference pulse from the index sensor 127 is also coupled to the track register counter 147 to increment the counter 147 once for each revolution of the disc 15. In turn, the counter 147 activates the head positioning apparatus 35 to move the record/playback head 31 to the next adjacent path, e.g., outwardly to the adjacent path, $n+1$.

The sector indicating pulses from the sector sensor 125 are also coupled to the length register counter 151, each pulse decrementing the counter 151 once toward zero. So long as the length register counter 151 is not decremented to zero, an enabling signal is coupled to the drive control apparatus 153 by the counter 151 via control line 157. Once decremented to zero, however, indicating that the complete information segment has been played back, the counter 151 no longer delivers the enabling signal to the drive control apparatus 153 and the disc drive apparatus is disabled.

The reference pulse coupled to the sector counter 161 from the index sensor 127 resets the counter 161 after each revolution of the disc 15, and accordingly the sector counter 161 counts from 0 to 32 during each revolution of the disc 15 responsive to the pulses from the sector sensor 125. The output of the sector counter 161, in turn, is coupled to a comparator 163 where it is compared with the output of a "subtract one" apparatus 165 coupled to the sector register 149. As previously described, the data in the sector register 149 corresponds to the initial path sector containing the desired information. Thus, because the output of the "subtract one" apparatus 165, is one less than the contents of the sector register 149 the comparator 163 provides an output control signal to the drive control apparatus 153 when the disc 15 is rotated such that the sector sensor 125 monitors the hole 37 corresponding to the path sector immediately preceding the initial sector containing the information to be played back.

Responsive to the control signal applied via the control line 167 from the comparator 163, the drive control apparatus 153 disables the motor-driven rotational positioning apparatus 39 and enables the brake apparatus 76 previously described in conjunction with FIG. 7. Thereafter, the drive control apparatus 153 enables the record/playback drive apparatus 41 and actuates a head control apparatus 169 to bring the record/playback head 31 in contact with the top surface of the disc 15 to playback the information stored thereon along the selected path.

Upon monitoring the next hole 37, which corresponds to the first sector of the information to be played back, the sector sensor 125 applies a pulse to the drive control apparatus 153 via line 171. The drive control apparatus 153 responds by unmuting the audio control apparatus 173 coupled to its output and permits the record/playback circuits 175 coupled to the audio control apparatus 173 to reproduce the stored information segments.

Thereafter, the index sensor 127 continues to periodically cause the head positioning apparatus 35 to move the record/playback head 31 outwardly to one path for each revolution of the disc 15 until the pulses from the sector sensor 125 decrement the length register counter 151 to zero. When the counter 151 reaches zero, the drive control apparatus 153 is disabled and the head 31 released from the disc 15. New information may then be input through the serial/parallel converter apparatus 143.

Figure 10:
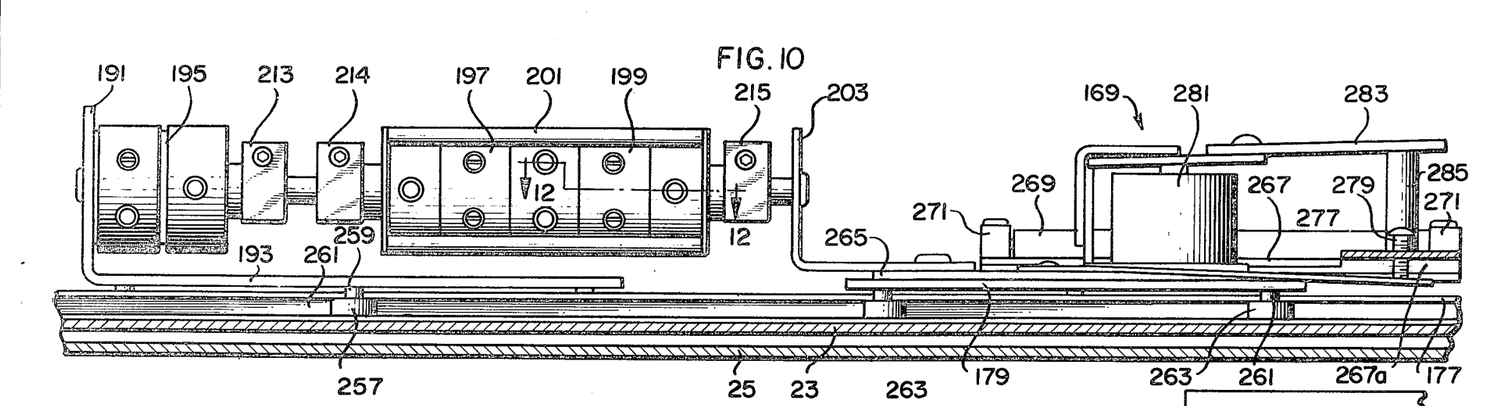
FIG. 10 is a sectional view of a portion of the apparatus for radially positioning the record/playback head across the disc taken along lines 10—10 in FIG. 2.
Figure 11:
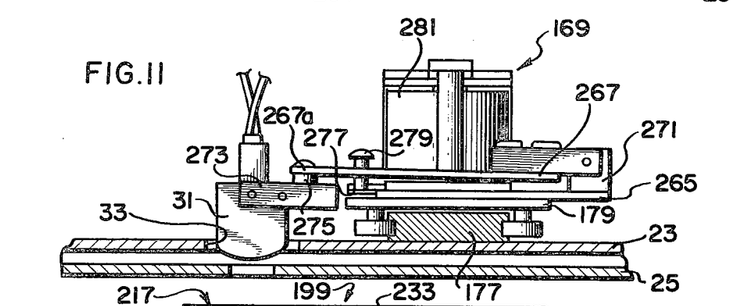
FIG. 11 is a sectional view of the apparatus shown in FIG. 10 taken along lines 11—11 in FIG. 2.

Referring now to FIGS. 10 and 11 in conjunction with FIG. 2, the record/playback head positioning apparatus 35 comprises a rail 177 having a platform 179 slidably mounted thereon for transporting the record/playback head 31 along the slot 33. In the present embodiment, the platform 179 and, correspondingly, the record/playback head 31, are initially positioned to a selected point along the slot 33 by four pneumatic cylinders 181, 183, 185 and 187 interconnected in piggyback fashion. That is, pneumatic cylinders 181 and 183 are connected back-to-back with their respective piston shafts extending outward therefrom in opposite directions. Pneumatic cylinders 185 and 187 are similarly positioned back-to-back with pneumatic cylinder 185 sharing a common piston shaft with pneumatic cylinder 187. The piston shaft of pneumatic cylinder 181, in turn, is connected to an upstanding stationary support member 189 fastened to the top plate 23 of the deck, while at the other end of the assembled pneumatic cylinder chain, the end of the piston shaft of pneumatic cylinder 187 is coupled to an integral upstanding flange 191 extending laterally from a second platform 193 which is also slidably mounted on the rail 177.

The second platform 193 is coupled to the record/playback head-carrying platform 179 by a pneumatic cylinder 195 and two oil-filled hydraulic cylinders 197 and 199. The pneumatic cylinder 195 is mounted on the plate 191 and shares its piston shaft with the oil-filled hydraulic cylinder 197 which, in turn, is back-to-back with the second oil-filled hydraulic cylinder 199 in a supportive frame 201. Completing the interconnection of the platforms 179 and 193, the piston shaft of the hydraulic cylinder 199 is coupled to an upstanding support member 203 mounted on the platform 179.

In operation, the pneumatic cylinders 181, 183, 185, 187 are selectively actuated to retract or extend their respective piston shafts and move the platform 193 along the rail 177. A positioning guide 205 having a series of notches, or indentations, 207 on one side edge thereof is affixed to the top plate 23 of the deck adjacent the portion of the rail 177 generally traversed by the second platform 193. A wheel 209 mounted at the end of an outwardly biased spring 211 is coupled to the platform 193 and engages the notches 207 of the positioning guide 205. When the spring-biased wheel 209 engages a particular one of the notches 207, the record/playback head 31, without further repositioning by the second cylinder chain 195, 197, 199 traces precisely the same path on the disc 15 each time the platform 193 is positioned at that location. In the present embodiment, the stroke length of the piston shafts of the pneumatic cylinders 181, 183, 185, 187 are 0.256 inch, 0.512 inch, 1.024 inch and 2.048 inches, respectively. Thus, by selectively actuating the pneumatic cylinders 181, 183, 185, 187 in various combinations in the well-known manner, the platform 193 is positionable over a distance of about three and three-quarter (3.840) inches at 0.256 inch intervals. Similarly, the notches 207 are spaced at 0.256 inch intervals from center to center. Thus, the record/playback head 31 is positionable to any one of sixteen particular locations thereby, and at each location, the head 31 traces a circular path on the top surface of the disc 15 as the disc is rotated.

Additional paths are accessed by selective actuation of the cylinders 195, 197, 199 to extend their piston shafts to move the platform 179, and thus the record/playback head 31, along the track 177. Specifically, the pneumatic cylinder 195 has a piston shaft length of 0.128 inch while the piston shafts of the oil-filled cylinders 197 and 199 are 0.64 inch and 0.32 inch, respectively. Stop members 213, 214, 215 are positioned on the piston shafts of cylinders 195, 197, 199, respectively, to limit the travel of the corresponding shaft to the required distance.

In order to accommodate longer information segments which cannot be stored along a single path, transitions between paths are effected by means of the oil-filled cylinders 197 and 199. The transition from a particular path on the disc 15 to the adjacent path is accomplished within a designated one of the path sectors by moving the record/playback head 31 radially at a uniform rate as the disc 15 is rotating during playback. It is essential that the head 31 be moved at a constant rate so that the identical path is followed between the same two adjacent paths each time. In the present embodiment, this is accomplished by means of the hydraulic cylinders 197 and 199. To simplify the explanation, only hydraulic cylinder 199 is shown in complete detail in FIG. 12.

Figure 12:
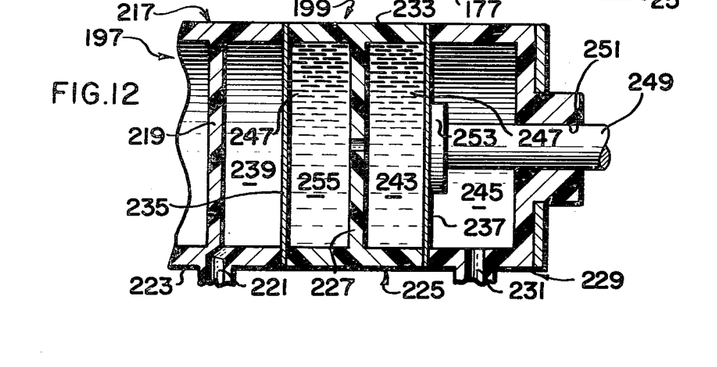
FIG. 12 is a sectional view of the apparatus shown in FIG. 10 taken along lines 12—12 in FIG. 10.

More particularly, the cylinder 199 comprises a centrally disposed cylindrical end section 217 which is shared with the hydraulic cylinder 197. The end section 217 has a center wall 219 spaced equidistant from its open ends to divide the section 217 in half to provide an end section for each of the cylinders 197 and 199. An air inlet/outlet 221 extends through the cylindrical wall 223 of the end section 217 to the interior of the chamber formed thereby. An adjacent cylindrical section 225 also having a center wall 227 disposed equidistant from each of its open ends abuts the end section 217, and a single end cap section 229 abuts the other side of the adjacent section 225. The cap section 229 has an air inlet/outlet 231 extending through its cylindrical wall 233. A pair of flexible diaphrams 235 and 237 inserted between sections 217 and 225 and sections 225 and 229, respectively, divide the interior of the cylinder 199 into the four chambers 239, 241, 243, 245. Chambers 241 and 243 contain an oil 247 having medium viscosity. A shaft 249 extends through an axially aligned aperture 251 in the end section 229 and has a plate 253 at its inner end which is in contact with and attached to the diaphram 237. The other end of the shaft 249 is coupled to the head-carrying platform 179. Compressed air is selectively coupled to or released from the end chambers 239 and 245 through the air inlets/outlets 221 and 231. An aperature 255 is provided in the center wall 227 of the center section 225 to permit the oil 247 to flow between the chambers 241 and 243.

In operation, when a transition is to be made from one path to the outwardly adjacent path, compressed air is introduced through the air inlet/outlet 221 into chamber 239 while the outer end chamber 245 is at atmospheric pressure. The resultant air pressure against the diaphram 235 forces some of the oil 247 in the chamber 241 to flow through the aperture 255 into the connected chamber 243. Because the air in the outer end chamber 245 is under less pressure, the other diaphram 237 expands outwardly into the chamber 245 due to the oil 247 forced into chamber 243. This, in turn, forces the shaft 249 outward causing the head bearing platform 179 to move radially along the slot 33 and into alignment with the next adjacent path. The cross sectional area of the aperture 255 limits the rate at which the oil 247 can flow between the two chambers 241 and 243 and, as a result, a steady, constant movement of the shaft 249 is effected. In this way, a constant rate of movement over a predetermined distance is provided, allowing the transition to be made at a uniform rate. Here, the transition is accomplished with the space of the transition sector by moving the platform 179 and thus the record/playback head 31 radially at the uniform rate determined by cylinder 199 as the disc 15 is rotated at the playback speed.

As illustrated in FIG. 4, once the head 31 has moved a distance radially equal to the spacing between adjacent paths, i.e., about 0.032 inch, the head 31 is brought to rest, and it thereafter traces the next adjacent circular path. Becuase the rotational speed of the disc 15 and the radial movement of the record/playback head 31 are constant, the angular displacement $\alpha$ of the transition path T between the circular paths decreases and the length of the transition path T increases for each outward transition between any two adjacent circular paths. It will be apparent that the arcuate sectors of the inner paths are shorter than the corresponding sectors of the outer paths. However, because the linear speed of the paths also increases proportionately with radius, the time required for a sector to pass beneath the record/-playback head 31 is independent of path radius, and since the path transition time is constant, the path transition occupies the same angular portion of the transition sector for each path.

Referring now again to FIGS. 10 and 11 in the present embodiment, the platform 193 is slidably supported on the slide rail 177 by three rollers 257 mounted on posts 259 to extend downwardly from the bottom of the platform 179 and engage longitudinal grooves 261 on opposite sides of the slide rail 177. One roller 257 is located in the groove 261 on one side of the slide rail 177 while the other two rollers (not shown) are found in the groove provided on the other side of the slide rail 177. This arrangement permits the platform 193 to move freely along the slide rail 177. Similarly, rollers 263 mounted on posts 264 attached to the underside of the head-carrying platform 179 engage the grooves 261 in the slide rail 177 to move the platform 179 freely therealong.

The head control apparatus 169 includes a plate 265 overlying a portion of the platform 179 and extending beyond the end of the platform 179, and an L-shaped plate 267 hinged at the edge of the plate 265 so that the arm portion 267a extends across the plate 265. In particular, a rectangular block 269 is mounted along one edge of the plate 265, while a pair of blocks 271 mounted at opposite ends adjacent the edge of L-shaped plate 267 are pinned to the block 269 to provide the hinging function. A yoke member 273 is mounted to the end of the arm 267a of the L-shaped plate at the ends of a pair of downwardly extending studs 275 on the underside thereof. The record/playback head 31, in turn, is mounted in the yoke 273 over the slot 33. A spring 277, connected at one end to the plate 265, lies adjacent the plate 265 and over the platform 179 to extend beyond the edge of the platform 179 and below the head mounting arm 267a. An adjustment screw 279 is provided in the mounting arm 267a to engage the spring 277 and support the record/playback head 31 a distance above the slot 33 and the disc 15. During recording or playback, however, the record/playback head 31 is moved downward to contact the disc 15. Specifically, a relay 281 mounted on plate 265 is actuated when the apparatus is operative in the record or playback modes so that an extension 283 of the relay contact arm 281a engages a post 285 mounted intermediately on the mounting arm 267a. Consequently the hinged L-shaped mounting plate 267 is forced downward thereby, against the spring 277, until the head 31 engages the disc 15 for recording or playback.

With reference now to FIG. 2, the pneumatic cylinders 71, 101, 181, 183, 185, 187, 195 and the hydraulic cylinders 197, 199 are under the control of a plurality of pneumatic valves 287a-j which selectively couple compressed air to the pneumatic and hydraulic cylinders. In particular, an externally generated supply of compressed air is coupled to the recording/playback apparatus through an air hose 289. A spliter 291 is connected to the hose 289 to couple compressed air from one output through a hose 293 to a first group of valves 287a-d and from another output through a hose 295 to a second group of valves 287f-j. A hose 297 couples compressed air from the first group of valves 287a-d to valve 287e.

Each valve 287, in turn, controls a corresponding one of the pneumatic and hydraulic cylinders. In each instance, one outlet of the valve 287 is coupled to an air inlet/outlet of the corresponding cylinder by a hose 299 while the other outlet of the valve 287 is coupled by a second hose 301 to an air inlet/outlet of the cylinder on the other side of the cylinder piston. By selectively supplying compressed air to the cylinder through one of the hoses 299 or 301, movement of the cylinder piston is controlled to selectively extend or retract the piston shaft. Thus, when compressed air is applied to one side of the piston of pneumatic cylinder 181 by valve 287a through hose 299, the piston shaft of cylinder 181 is retracted. Compressed air coupled to the other side of the piston of cylinder 181 through hose 301 is effective to extend the piston.

In a similar manner, the valves 287b–j are effective to control the other pneumatic and hydraulic cylinders. More particularly, valves 287b–e selectively enable pneumatic cylinders 183, 185, 187, 195, respectively, and valves 287g and 287h control the hydraulic cylinders 197 and 199. Valve 287i is coupled to the pneumatic cylinder 101 of the automatic spindle mechanism 27 by a pair of air hoses 303 and 305 to selectively raise and lower the spindle to engage the disc 15. Another pair of the valves 287f and 287j are coupled to the pneumatic cylinders 71 in the disc drive apparatus.

Figure 13:
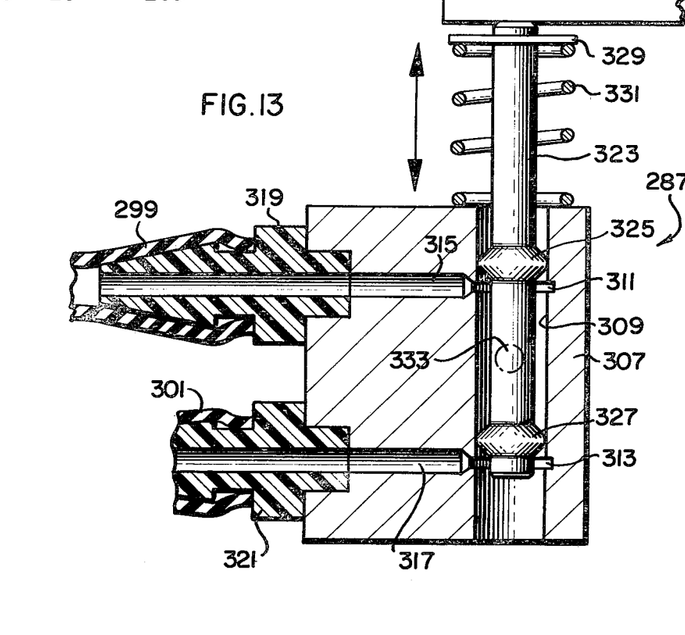
FIG. 13 is a sectional view of the valve apparatus taken along lines 13—13 in FIG. 2.
Figures 13A, 13B, 13C:
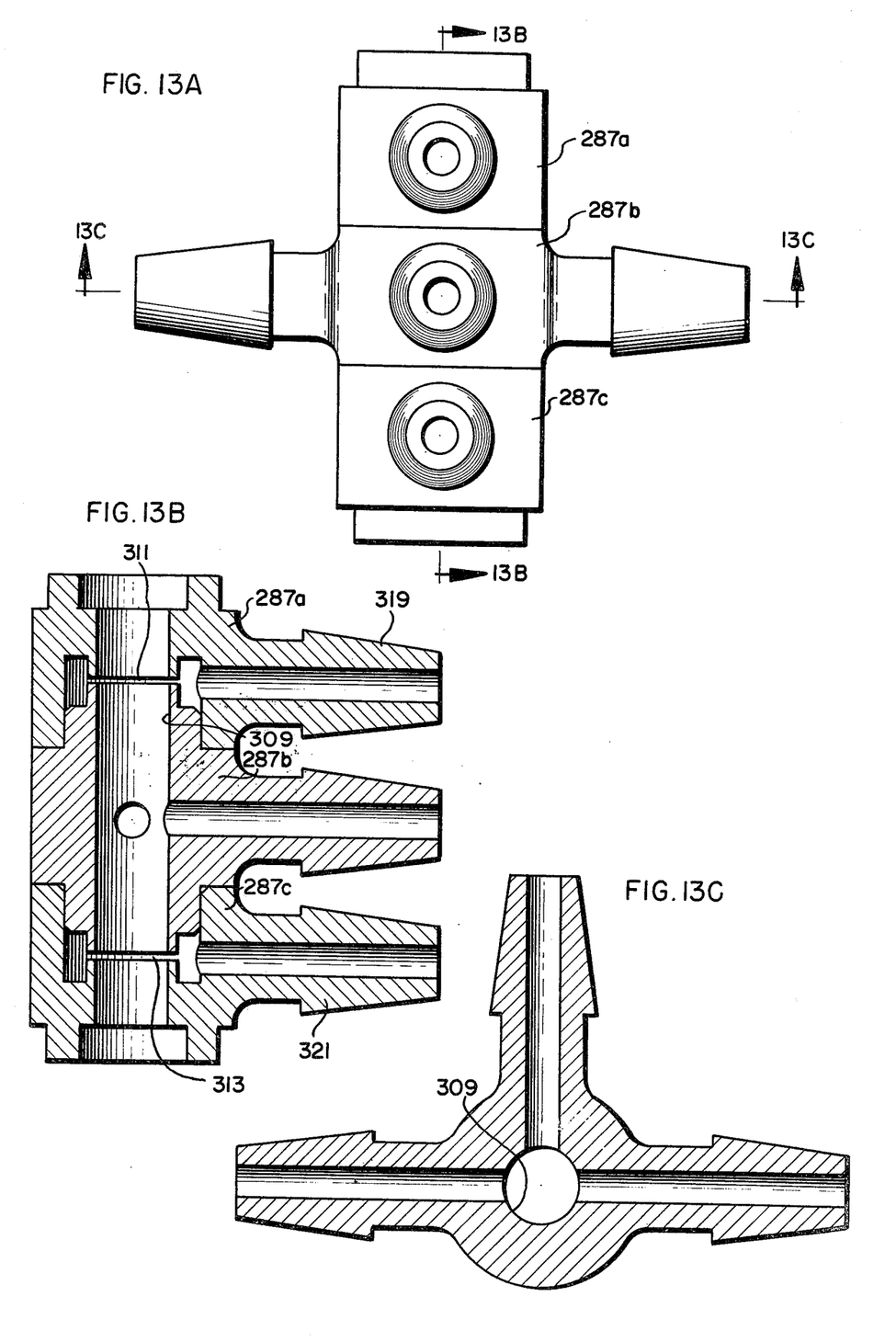
FIGS. 13A-C are views showing an embodiment of the valve apparatus shell in greater detail.

Referring to FIG. 13, one of the pneumatic valves 287 for selectively actuating and deactuating the several pneumatic and hydraulic cylinders is shown in greater detail. The valve apparatus 287 comprises a block 307 having a tubular orifice 309 extending therethrough from top to bottom. In practice, the block may be formed from metal, plastic or any other strong, suitably air impervious material. A pair of annular grooves 311 and 313 encircle the orifice 309 at a predetermined spacing from each other and from opposite ends of the orifice 309. Tubular openings 315 and 317 extend laterally from the grooves 311 and 313, respectively, through the sides of the block 307 to interconnect the tubular orifice 309 with the outside. A pair of air inlet/outlet members, or nozzles 319 and 321 are mounted in the side of the block 207 to communicate with the tubular openings 315 and 317, respectively, and provide a mounting for the air hoses 299 and 301, respectively. A shaft 323 resides in and extends downwardly into the tubular orifice 309 and is sufficiently long so that a portion of the shaft 323 extends upwardly and out of the top of the tubular orifice 309. A pair of rubber O-rings 325 and 327 are mounted on the shaft 323 and spaced equal to the spacing between the annular grooves 311 and 313. A locking ring 329 is affixed to the upper end of the shaft 323 to engage a spring 331 encircling the shaft 323. The spring 331 is also restrained by the top surface of the block 307. The locking ring 329 normally biases the shaft 323 so that each one of the O-rings 325 and 327 resides above its corresponding annular groove 311 and 313, respectively. In this position, compressed air entering the orifice 309 through a compressed air inlet 333 in the back side of the tubular orifice 309 is furnished to the air hose 299 through the opening 315 and the corresponding air inlet/outlet nozzle 319 and the piston shaft of pneumatic cylinder 181 (FIG. 2) is extended. The piston shaft of the cylinder 181 is selectively retracted into the cylinder by energizing a relay associated with the valve 287 so that the relay arm 335 is drawn downward to compress the locking ring 329 against the spring 331 and force the shaft 323 downward in the tubular orifice 309. When this occurs, the rubber O-rings 325 and 327 are transported by the shaft 323 downward a short distance until they reside adjacent the other edge of their corresponding annular grooves 311 and 313, respectively. The annular grooves 311, 313 provide a large orifice to maximize air flow with minimal movement of the shaft 323 to effect switching. An embodiment illustrating an inexpensive valve 287 comprising three molded plastic pieces 287a, 287b, 287c with integral nozzles eliminating the need for machining the grooves 311, 313 is shown in FIG. 13A. Accordingly, the compressed air is blocked from release through the upper air hose 299 and, instead, the compressed air is channeled through the lower opening 317 and the air inlet/outlet nozzle 321 to the bottom air hose 301. Simultaneously, the compressed air is released from the other side of the piston in the cylinder 181 through opening 315 which is now coupled directly to the atmosphere through the tubular orifice 309, allowing the piston and its associated shaft to be retracted to effect a repositioning of the record/playback head 31.

As illustrated in FIG. 2, a plurality of such valves 287a–d can be placed side by side with their tubular orifices 309 interconnected to a common air inlet 337 extending through the combined blocks 307 in a manner similar to the compressed air inlet 333 shown in FIG. 13.

Figure 14:
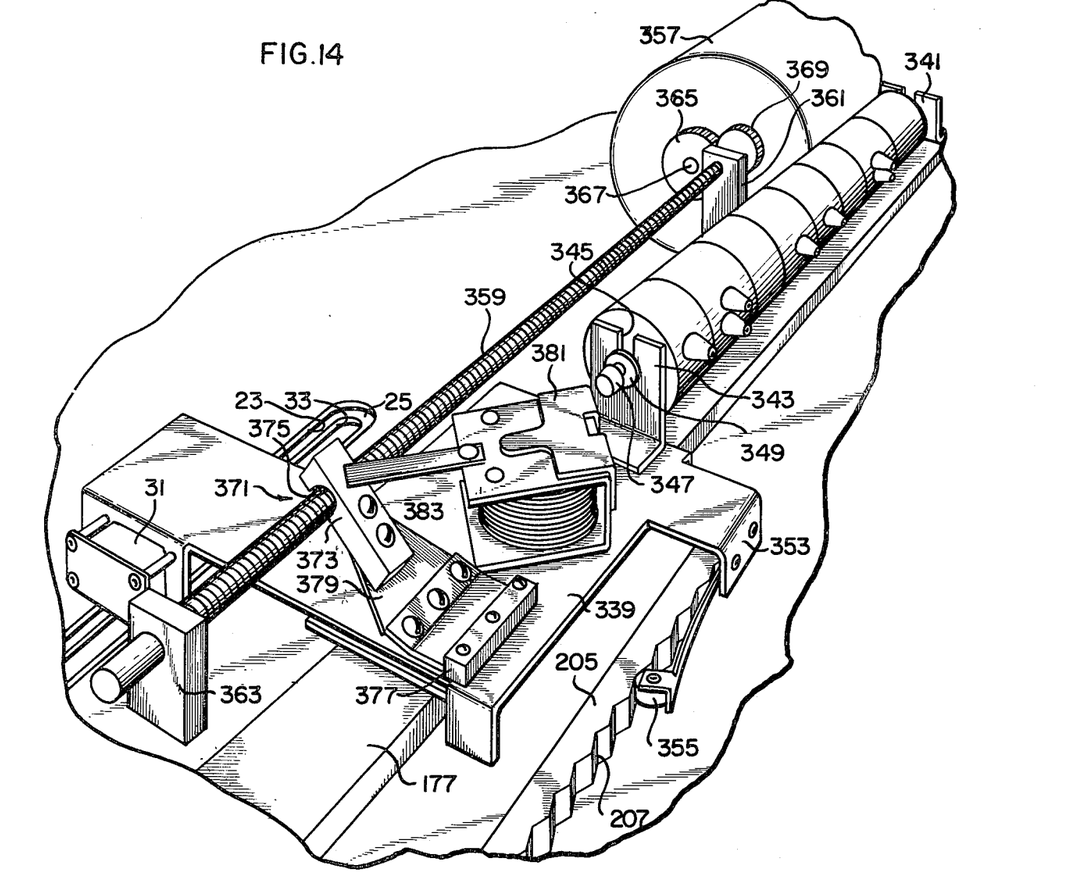
FIG. 14 is a perspective view illustrating an alternative embodiment of the radial positioning apparatus.
Figure 15:
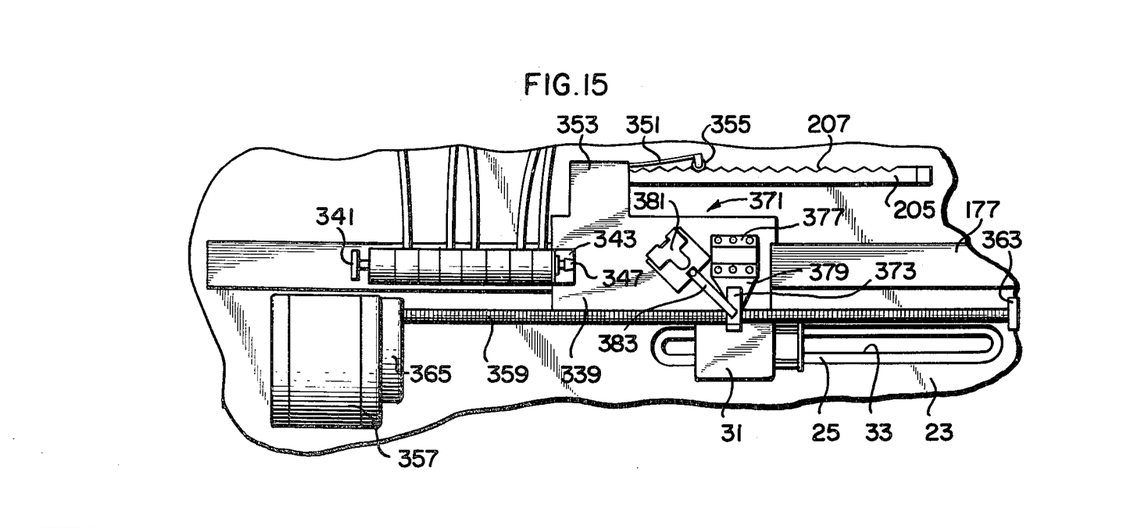
FIG. 15 is a partial top plan view of the apparatus shown in FIG. 14.

An alternative embodiment of the record/playback head positioning apparatus is shown in FIGS. 14 and 15. In that particular embodiment, the platform 339 carrying the record/playback head 31 is mounted on the slotted rail 177 in the manner previously described while the pneumatic cylinders 181, 183, 185, 187 provided to position the head 31 to a general area of the disc 15 are mounted over the slide rail 177 between a stationary upstanding support member 341 at one end of the rail 177 and an upstanding support member 343 mounted on the platform 339. The support member 343 has a slot 345 therein for engaging the piston shaft of the pneumatic cylinder 187. The piston shaft has a cap 347 at its end and a rubber grommet 349 is provided on the piston shaft to engage the slot 345 of the upstanding support member 343 to secure the pneumatic cylinders to the platform 339. As before, selective actuation and deactuation of the several pneumatic cylinders 181, 183, 185, 187 permits the platform 339 carrying the record/playback head 31 to be selectively positioned to a predetermined path on the disc 15. Once so positioned, the positioning is maintained by means of the spring member 351 mounted to a flange 353 extending from the platform 339. A wheel 355 is provided at the end of the spring member 351 to contact the notches 207 of the positioning guide 205 located adjacent the rail 177 as previously described.

The apparatus differs in principle from the apparatus previously described primarily in the method of finely positioning the record/playback head 31 from one particular intermediate path to an immediately adjacent path. More particularly, the apparatus further includes a motor 357 for turning a threaded rod 359 supported by and extending through a pair of support members 361 and 363 located adjacent and parallel to the slide rail 177 on the top deck plate 23. A gear 365 on the motor shaft 367 engages a gear 369 mounted to the end of the threaded rod 359 to turn the rod. A screw-driven assembly, identified generally at 371, comprises an arm member 373 having a channel 375 in its bottom side. The channel 373 is threaded to correspond to the thread of the rod 359. The arm member 373 is mounted to the platform 339 by a mounting member 377 so that its threaded channel 375 is positioned above the threaded rod 359. A spring-like member 379 holds the threaded portion of the screw-driven assembly 371 away from the threaded rod 359, and consequently the record/playback head 31 is similarly maintained in position away from the disc 15.

In operation, a relay 381 is selectively enabled in the well known manner and an arm member 383 extending therefrom to contact the block 373 is forced downward on the arm 373 causing it to engage the threaded rod 359 with its own threaded channel 375. Simultaneously, under selective motor control, the motor 357 turns the threaded rod 359 and the engagement between the threaded channel 375 of arm member 373 and the threaded rod 359 causes the platform 339 to be transported along the slide rail 177 for predetermined distance at a predetermined rate. Thus, as in the previously described embodiment, the rate of travel of the record/playback head 31 is constant and the transition is made.

Accordingly, there has been shown and described a record/playback apparatus for effecting high-speed access to information stored on a thin, flexible grooveless disc and for playing back or recording information from the accessed portion of the path at lower disc speed. Although the apparatus has been described generally in connection with the playback mode of operation, it will be understood that corresponding operations occur in the record mode.

While a particular embodiment of the present invention has been shown and described, it will be obvious to those skilled in the art that various changes and modifications may be made without departing from the invention in its broader aspects. Accordingly, the aim in the appended claims is to cover all such changes and modifications which may fall within the true spirit and scope of the invention.

What is claimed is:

1. Apparatus for accessing selected sectors of one or more of a plurality of concentric circular paths on a flexible, grooveless recording disc to selectively store discrete segments of information along said paths and retrieve discrete segments of information previously stored along said paths for playback, each of said paths being divided into a corresponding number of said sectors along which a corresponding number of said discrete information segments are stored, said apparatus comprising:

means including a record/playback head for selectively storing said information segments on said disc and for selectively sensing said stored information for playback during retrieval;

means for radially positioning said record/playback head across said disc into alignment with a particular one of said paths;

means for engaging said disc adjacent the rim thereof to rotate said disc at high speed until said disc is rotationally positioned such that a selected one of said path sectors comprising said particular path is aligned with said record/playback head; and means for engaging said disc adjacent the rim thereof after said disc is positioned to said selected path sector to rotate said disc at lower speed along one or more of said path sectors while said record/playback heat tracks said path to store said information on said disc or to play back said information from said disc.

2. Apparatus in accordance with claim 1 wherein said high speed rotating means includes a high speed motor having a continuously rotating shaft, said high speed motor being positioned adjacent said disc rim with said continuously rotating high speed motor shaft extending inwardly for a distance past the rim of said disc toward the center of said disc, said high speed rotating means including a pinch roller and means for selectively pressing said high speed pinch roller against said disc and said high speed motor shaft to squeeze said disc between said high speed pinch roller and said high speed motor shaft, said continuously rotating high speed motor shaft and said high speed pinch roller cooperating to rotate said disc at high speed, and wherein said lower speed rotating means includes a low speed motor having a continuously rotating shaft, said low speed motor being positioned adjacent said disc rim with said continuously rotating low speed motor shaft extending inwardly for a distance past the rim of said disc toward the center of said disc, said lower speed rotating means including a pinch roller and means for selectively pressing said low speed pinch roller against said disc and said low speed motor shaft to squeeze said disc between said low speed pinch roller and said low speed motor shaft, said continuously rotating low speed motor shaft and said low speed pinch roller cooperating to rotate said disc at lower speed.

3. Apparatus in accordance with claim 2 including means for positioning said high speed motor and said low speed motor with said continuously rotating high speed motor shaft and said continuously rotating low speed motor shaft skewed from radial alignment with said disc and means for mounting said high speed pinch roller and said low speed pinch roller in alignment with said shafts, said motor shafts and said pinch rollers combining to exert outwardly directed tension on said disc.

4. Apparatus in accordance with claim 1 wherein said disc comprises a lightweight, flexible plastic disc having a magnetic oxide film on at least one surface.

5. Apparatus in accordance with claim 1 wherein said disc has a center hole, an indexing hole at a first radius from said center hole and a plurality of holes equally spaced around said center hole at a second radius from said center hole, said plurality of equally spaced holes combining with said center hole to define a corresponding plurality of said path sectors for each of said paths, and comprising means including a centrally located spindle for engaging said center hole to provide a pivot point about which said disc is rotated, said apparatus further comprising first and second light emitting diode and light sensing phototransistor pairs and means for energizing said diodes to cause each of said diodes to emit a beam of light toward the corresponding one of a said phototransistors, said disc being located between said diodes and said phototransistors when said center hole of said disc is engaged by said spindle such that said disc normally blocks said light beams from said phototransistors, said first diode and phototransistor pair being aligned with said indexing hole at said first radius from said center hole such that said light beam from said first diode is received by said first phototransistor through said indexing hole once during each revolution of said disc, said second diode and phototransistor pair being aligned with said sector defining holes at said second radius from said center hole such that said light beam from said second diode is received by said second phototransistor through said sector defining holes as said disc rotates, said first phototransistor developing an output pulse providing a reference for determining the rotational position of said disc with respect to said record/playback head and said second phototransistor developing a pulsed output signal representative of the rotational position of said disc with respect to said record/playback head, the number of said sector pulses corresponding to the number of said sectors which have passed by said second diode and phototransistor pair since said indexing hole last passed by said first diode and phototransistor pair, and control means responsive to said first and second diode phototransistor pairs for selectively enabling said high speed and lower speed rotating means and said record/playback means.

6. Apparatus in accordance with claim 5 including:

a track register counter for receiving input data identifying the particular one of said paths in which said information is stored or is to be stored, said track register counter being coupled to said head positioning means to reposition said record/playback head responsive to said input data contained in said track register counter, said reference pulses being coupled from said first phototransistor to said track register counter to increment said track register counter and reposition said head to the next adjacent path after each revolution of said disc;

a sector register for receiving input data indentifying said sector in which the first of said information segments is stored or to be stored;

a sector counter coupled to said first and second phototransistors, said sector counter being incremented by each of said pulses from said second phototransistor to register the number of said sector pulses received from said second phototransistor, said sector counter being reset by each of said reference pulses from said first phototransistor;

a comparator having inputs coupled to said sector counter and said sector register and an output coupled to said control means, said comparator developing an output signal which causes said control means to disable said high speed rotating means and enable said lower speed rotating means responsive to the number of pulses counted by said sector counter reaching a predetermined level with respect to said input data held by said sector register, said control means thereafter enabling said record/playback means;

a length register counter for receiving input data identifying the number of said sectors in which said information is stored or are to be stored;

said length register counter being coupled to said control means and applying a signal to said control means for enabling said lower speed rotating means until said length register is fully decremented by said sector pulses whereupon said control means disables said lower speed rotating means and said record/playback means.

7. Apparatus in accordance with claim 6, including "subtract one" means for coupling said sector register to said comparator, said "subtract one" means operating on said data in said sector register to develop an input to said comparator corresponding to said sector immediately preceding said sector in which said first information segment is stored or to be stored, the resulting comparator output signal causing said control means to disable said high speed rotating means during said preceding sector.

8. Apparatus in accordance with claim 7 including means for braking said disc after said disc has been rotated at high speed to said preceding sector, said braking means being enabled responsive to said control means when said high speed rotating means is disabled.

9. Apparatus in accordance with claim 3 wherein said record/playback means includes audio circuit means for playing back said information and muting means for enabling said audio circuit means responsive to said control means receiving the next of said sector pulses from said second phototransistor after said high speed rotating means has been disabled and said lower speed rotating means has been enabled.

10. Apparatus in accordance with claim 6 including means for inputting said identifying data into said track register counter, said sector register and said length register counter, initialization means for monitoring said apparatus to determine when said disc in position on said spindle and thereafter enable said data inputting means, said initialization means enabling said control means after said data has been input into said track register counter, said sector register and said length register counter.

11. Apparatus as claimed in claim 1 wherein said head positioning means comprises a rail and first platform which moves on said rail, means for supportably mounting said record/playback head on said platform and including biasing means for said record/playback head away from said disc, said rail being positioned such that said head travels radially from adjacent said center hole of said disc toward said disc rim, means for selectively moving said head into contact with said disc, a second platform which moves on said rail, a stationary support member, means including a first plurality of pneumatically actuated cylinders coupled in series between said second platform and said stationary support member and having selectively extendable and retractable shafts for moving said second platform in uniform steps to a predetermined location relative to said stationary support member, means including a second plurality of pneumatically actuated cylinders coupled in series between said first platform and said second platform and having selectively extendable and retractable shafts for moving said first platform relative to said second platform, said first and second pluralities of cylinders selectively positioning said heat to a particular one of said paths.

12. Appartus in accordance with claim 11 wherein two of said second plurality of pneumatic cylinders are positioned back-to-back and have respective shafts extending in opposite directions in said series, each of said cylinders having a tubular outer wall and an end wall, said cylinders having a common wall having a hole therethrough, each of said cylinders having a flexible diaphragm dividing said cylinder into two chambers, said shaft of each of said cylinders being attached to the corresponding one of said diaphragms and extending through the corresponding one of said cylinder end walls, said chambers of said cylinders adjacent said common wall being filled with oil, the other of said chambers of each of said cylinders having an air inlet/outlet, and including means for selectively pumping compressed air into one of said cylinders through the corresponding one of said air inlet/outlets and opening said air inlet/outlet of the other of said cylinders to allow the air in said other cylinder to exit, said compressed air in said first cylinder exerting pressure on said diaphragm causing a portion of said oil to flow from said first cylinder into the adjoining chamber of said second cylinder through said hole and retract said shaft of said first cylinder, said oil causing said diaphragm of said second cylinder to expand into said open chamber of said second cylinder and extend said shaft of said second cylinder, said first and second shafts being of lengths such that the difference in the lengths of said first and second shaft is equal to the distance between adjacent paths on said disc, said hole being sized such that the rate of flow of said oil through said hole is such that the transition from one of said paths to an adjacent one of said paths is accomplished at a constant rate and within the space of one of said sectors.

13. Apparatus in accordance with claim 11 including a positioning guide located in parallel with said rail and having a plurality of notches, a biasing spring having one end mounted to said second platform and a second end adjacent said positioning guide, and a wheel rotatably mounted at said second end of said spring for engaging said notches as said first plurality of cylinders repositions said second platform to align said record/playback head with a corresponding one of said paths on said disc, said second plurality of cylinders then being effective to reposition said record/playback head to said paths intermediate said paths corresponding to adjacent ones of said notches.

14. Apparatus as claimed in claim 1 wherein said head positioning means comprises a rail and a platform which moves on said rail, means for supportably mounting said record/playback head on said platform and including biasing means for holding said record/playback head away from said disc, said rail being positioned such that said head travels radially between said center hole and said disc rim, a stationary support member, means including a plurality of pneumatically actuated cylinders coupled in series between said platform and said stationary support member and having selectively extendable and retractable shafts for moving said platform in uniform steps to a predetermined location relative to said stationary support member, a positioning guide located in parallel with said rail and having a plurality of notches, a biasing spring having one end mounted to said platform and a second end adjacent said positioning guide, a wheel rotatably mounted at said second end of said spring for engaging said notches as said plurality of cylinders repositions said platform to align said record/playback head with a corresponding one of said paths on said disc, means including a threaded rod positioned adjacent said rail, motor means for turning said threaded rod, an arm member mounted to said platform by said head biasing means, said arm member having a threaded channel, and means for selectively moving said record/playback head into contact with said disc to engage said path and said arm member into contact with said threaded rod such that said threaded channel engages said threaded rod and moves said platform when said motor means is selectively enabled to move said record/playback head to the adjacent one of said paths, said plurality of cylinders and said motor-driven threaded rod and said arm member selectively positioning said record/playback head to a particular one of said paths.

* * * * *

UNITED STATES PATENT AND TRADEMARK OFFICE
CERTIFICATE OF CORRECTION

PATENT NO. : 4,124,872
DATED : November 7, 1978
INVENTOR(S) : Franklin M. Propst It is certified that error appears in the above—identified patent and that said Letters Patent are hereby corrected as shown below:

Column 18, line 1,     "claim 3" should be --claim 7--; and     Column 18, line 41,     change "heat" to --head--.

Signed and Sealed this

Twenty-sixth Day of February 1980

[SEAL]

*Attest:*

SIDNEY A. DIAMOND

*Attesting Officer*      *Commissioner of Patents and Trademarks*